Figure 1:
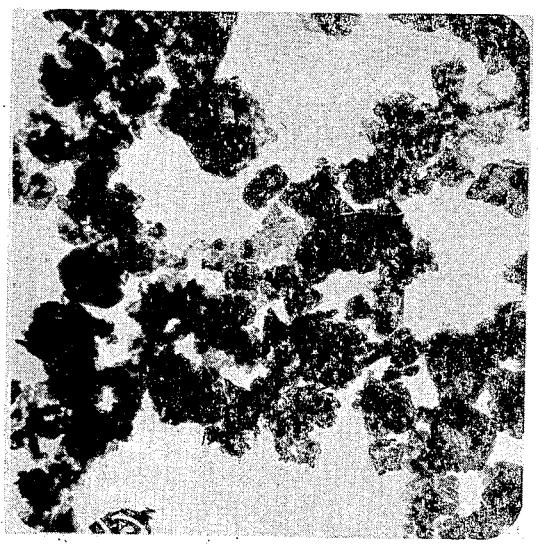

Inventors
ROBERT K. MAYS
ORLANDO L. BERTORELLI

United States Patent Office 3,328,124
Patented June 27, 1967

3,328,124
REACTIVE SILICA MATERIALS AND PROCESS
OF PRODUCING THEM
Robert K. Mays and Orlando Leonard Bertorelli, Havre de Grace, Md., assignors to J. M. Huber Corporation, Borger, Tex., a corporation of New Jersey
Filed Oct. 10, 1961, Ser. No. 144,168
16 Claims. (Cl. 23—182)

This invention relates to new particulate silica materials having distinctive chemical and physical characteristics and distinctive properties, including a very high chemical reactivity and high sorption powers for moisture and other substances. The invention relates also to a process of producing such materials.

Finely divided siliceous materials of various kinds have been known heretofore. Among those which have found important uses as inorganic fillers, carriers, extenders or pigments are:

(1) The natural crystalline silicates or clays, such as kaolin;

(2) Finely pulverized quartz, which is a crystalline silica of little chemical reactivity composed of $SiO_4$ tetrahedra spirally linked into hexagonal prism structures;

(3) Precipitated silicic acid compositions, or hydrated silicas, which have $SiO_4$ tetrahedra and OH groups chaotically linked into minute spherical microcrystalline amorphous masses that tend to flock together;

(4) Pyrogenic or fumed silicas, which are discrete, anhydrous, spherical colloidal masses formed principally by siloxane (Si-O-Si) groupings; and (5) Very finely divided precipitated sodium aluminum silicates, such as those disclosed in United States Patent No. 2,739,073.

It has long been known that more or less impure siliceous materials are obtained as residues in the reaction slurries when particulate hydrous aluminum silicates such as kaolin or similar clays are reacted in aqueous media with strong mineral acids for the extraction of alumina from the silicates, such, for example, as when reacting clay with sulfuric acid for the production of alum. Although there have been various proposals for producing or treating the residues so as to recover them in useful forms, these siliceous materials, or so-called silica residues, commonly have been separated from the reaction slurries and discarded for lack of substantially commercial value. As disclosed in U.S. Patent No. 2,848,346, however, an alum solution produced from kaolin and still containing the silica residue may be used successfully by reaction with sodium silicate for the production of a precipitated sodium aluminum silicate pigment of increased $SiO_2$ content.

According to the present invention, we have discovered that silica materials can be provided in a very highly reactive particulate form in which the particles consist essentially, by analysis, of silica and bound water and, unlike those of known particulate siliceous materials, are quite discrete, cryptocrystalline particles which have a distinctly phylloidal (leaf-like) structure characterized, among other things, by a very great width to thickness ratio, or thinness, and distinctive properties of chemical reactivity and of sorptiveness. The composition, form and properties of the particles make these new materials valuable for many important uses.

The silica materials according to the invention contain, by chemical analysis, at least 82%, advantageously more than 85%, by weight of $SiO_2$ together with at least 5% of bound or combined $H_2O$ and less than 12% of other oxides. Structurally, the atoms of silicon, oxygen and hydrogen are linked in an orderly laminar arrangement giving the individual particles their distinctly phylloidal form and providing reactive silanol (SiOH) groups at their surfaces to a concentration of more than 10 micromols per square meter of their flat or particle-forming surface area.

The particles of the new materials have variegated facial dimensions in the range of from about 0.1 to about 5 microns, the preponderant particle widths generally being about 0.5 to 2 microns. Their thicknesses are far smaller, ranging typically from as little as about .005 micron up to about .050 micron. As shown, for example, by stereoptic and shadowgraphic electron micrographs, their characteristic or preponderant thickness amounts to only about .008 to .015 micron. Thus the particles have an extremely high characteristic width to thickness ratio, of the order of magnitude of 100 to 1.

The BET surface area of the materials, as determined by the well-known Brunauer, Emmett and Teller method ("BET Multilayer Absorption Theory," Journal of the American Chemical Society, vol. 60 (1938), p. 309), generally is in the range of about 40 to 130 square meters per gram. The most finely divided refined kaolins, in contrast, have a BET surface area of about 15 square meters per grams, while precipitate silicic acid pigments generally have BET surface areas in the range of 70 to 200 square meters per gram.

The materials of the invention are further unlike known materials in that their total surface area is constituted to a very important extent by measurable porosity in the elementary particles. From about 10 to about 40% of the surface area is formed by pores which appear to exist as gaps or interstices in the atomic networks forming the particle structure. The pores have dimensions predominantly of from about 22 to about 45 Angstrom units (.0022 to .0045 micron), as determined by recognized analytical methods (A. Voet, "Determination of Pore Size Distribution," Rubber World, vol. 130 (1958), pp. 63, 232). Thus they give the materials a distinctive selective power of sorption, making them especially receptive to substances to substances having molecular dimensions smaller than the pore dimensions and relatively unreceptive to substances of larger molecular size.

The high chemical reactivity of the materials is readily manifested by the rate and extent of their reaction with bases in dilute aqueous solutions. For example, when these materials are reacted at a concentration equivalent to 39.6 grams of $SiO_2$ per liter in a 1-normal solution of NaOH (containing 31.5 grams of $Na_2O$ per liter) at 50° C., at least 85% of their $SiO_2$ content generally is dissolved by the solution within 120 minutes. Those of the materials which contain more than 85% of $SiO_2$ are so reactive that over 90% of their $SiO_2$ content is soluble in such a solution within 90 minutes; and when the $SiO_2$ content is over 88% more than 90% of it is soluble within 60 minutes. In the materials of highest $SiO_2$ content, i.e., about 90 to 92% $SiO_2$, the 60-minute reactivity reaches values of 97 to 99.5%, and like values are reached even in 30 minutes.

The high reactivity of the materials is attributable to a distinctive morphological structure of the siliceous particles. The particles are cryptocrystalline, in that their X-ray diffractograms display a broad amorphous band having no clearly identifiable crystal characteristic. They appear to be formed of tetrahedral $SiO_4$ groups linked together in orderly laminar networks through the mutual sharing of four oxygen atoms by internal silicon atoms and the mutual sharing of three oxygen atoms by peripheral silicon atoms, the fourth valences of peripheral silicon atoms being satisfied by hydroxyl radicals so that these atoms form parts of peripheral silanol (SiOH) groups. Calculations from analytical data indicate that the silanol concentration in the particles is greater than 10 micromols, typically being at least 20 micromols, per square meter of their flat surface area.

Morphological studies of the materials also indicate that their porosity is distributed in the particle structure in a certain way. Materials are provided according to the invention which have pores predominantly of 22 to 27 Angstrom units (.0022 to .0027 micron) in diameter in positions generally parallel to the "$a$" and "$b$" crystallographic axes of the particles, while pores predominantly of 27 to 45 Angstrom units (.0027 to .0045 micron) in diameter occur in positions generally parallel to the "$c$" crystallographic axis.

Among the uses of the new silica materials are many which may be served, though more expensively, by some of the known materials mentioned hereinbefore, and others which are not served effectively by known materials. Their reactivity makes them useful, for example, for the production of more valuable silicates by direct reaction of them with various bases, including alkali metal and alkaline earth metal oxides and other basic metal oxides such as zinc, lead and magnesium oxides. Their chemical and surface characteristics make them useful as preferential absorbing agents for moisture, as in the conditioning of table salt; also, for the sorption of various gases, vapors, odors and liquids, and as carriers for chemicals such as rubber accelerators or antioxidants, insecticides, fungicides, or the like. They are also useful as fillers, pigments or extenders in various compositions, including rubber, plastics and other polymers, ceramics, adhesives, paints, inks, paper, paper coatings glass compositions, and the like.

Surprisingly, it has been discovered that the new materials will react directly in finely divided state with finely divided barium, calcium, zinc, lead or magnesium oxide to form the corresponding metal silicate in a definite particulate form which is substantially free of soluble salts and can be produced far less expensively than the most nearly comparable metal silicates heretofore available. The reaction can be effected by simply suspending the solids in an aqueous medium and heating the suspension, for example, to 90° to 100° C., although lower temperatures may be used with longer reaction times and high temperatures for faster reactions. A violent exothermic reaction occurs in the course of heating the material with magnesium oxide in an aqueous medium, and a definitely crystalline magnesium silicate having an extremely high BET surface area, for example, of 350 to 450, results in the medium.

Furthermore, it has been found that the materials can be reacted or condensed with primary and secondary alcohols, for example, with butanol, decanol or octadecanol, in a pressure vessel at temperatures of, for example, 200° to 240° C., to form valuable esterified silicas or so-called estersils which retain the leaf-like particle characteristics of the original silica material and yet have most of its silanol groups, for example, at least 90% of them, reacted with the esterifying agent.

Still further, it has been found that by simply digesting the materials with sodium aluminate in an aqueous medium at about 90° to 100° C. a sodium aluminum silicate is produced in a distinctly cubic particle form having an orderly crystalline structure permeated with pores of definite size, this product being sorptive to moisture at elevated temperatures and valuable for use in the separation of gases of different molecular sizes.

Still further, the materials react directly with liquid alkali silicates upon being mixed and heated with them, to produce silicates of increased $SiO_2$ content, such, for example, as liquid sodium silicates having a $Na_2O$ to $SiO_2$ ratio of 1 to 4 or more, and solid sodium silicates having a $Na_2O$ to $SiO_2$ ratio of 1 to about 5. This capacity of the new materials makes them valuable for use in paperboard and boxboard adhesives and in silicate coating compositions such as are used for roofing granules, asbestos shingles, and analogous products.

According to a further aspect of the invention, we have discovered that these reactive silica materials can be produced by the direct reaction of finely particulate hydrous aluminum silicates with strong sulfuric acid, and they can be produced quite inexpensively by the use of extremely finely divided clays such as kaolin as the raw material supplying the hydrous aluminum silicate. In this way, a relatively inexpensive raw material will yield not only a more valuable particulate silica material but also a solution of an aluminum salt that is useful either as such or as a raw material for the production of other substances; for example, as a source of alum.

In a process found effective for the production of the materials, a finely particulate hydrous metal silicate, for example, a finely divided hydrous aluminum silicate such as a refined kaolin clay, is dispersed thoroughly in water so as to suspend the particles in essentially their elementary form; and the suspended particles, while kept in vigorous agitation, are reacted in a closed, pressure-resistant vessel with sulfuric acid which is incorporated in the aqueous liquid in an amount at least approximately equivalent chemically to the metal oxide content of the silicate, and advantageously in excess of such stoichiometric amount, at a concentration sufficient to produce a violent exothermic reaction bringing the suspension quickly to a multiple-atmospheric steam pressure and a temperature in excess of 150° C.

The violent exothermic reaction brings the suspension to the high pressure and temperature in a period of only a few minutes, usually in about 10 to 16 minutes. In some cases this reaction may be initiated by merely mixing the acid with the silicate suspension, as when the temperature of the suspension is somewhat elevated and the acid concentration resulting in the aqueous liquid is in the range of about 50 to 60%. In other cases, such as when the acid concentration is in the range of 30 to 50%, the violent reaction may be initiated by heating the suspension, such as by the injection of live steam for a few minutes, until the reaction "kicks off" and itself begins quickly to raise the temperature and the pressure in the vessel.

The gauge pressure attained by the violent reaction heating usually and preferably is in the range of 130 to 235 p.s.i., corresponding to a temperature of about 180° to 205° C. If the temperature tends to rise too high, it may be limited to a desired maximum value by venting steam from the reaction vessel when the corresponding peak pressure is reached. The temperature should be kept well below 230° C. in order to obtain a finished product having the desired porosity and free of objectionable acidity.

After the suspension has reached the peak pressure and temperature produced by the violent exothermic reaction, it is digested, with continued vigorous agitation, at a temperature keeping it under superatmospheric steam pressure, and until more than 85% of the metal oxide content of the silicate particles has been extracted into the aqueous acid medium. The digestion usually should be continued for a period of hours, so that the resulting suspended solid particles will have the required high content of $SiO_2$. Then the temperature and pressure of the suspension are reduced and the solid particles are separated from the reaction liquid, washed to remove water soluble substances, and dried.

The digestion can be carried out at a temperature between 105° and 230° C., but it is effected most advantageously at a temperature above 150° C. and a gauge pressure below 170 p.s.i., such as in the temperature range of 160° to 190° C. A digestion period of 2 to 8 hours is sufficient at temperatures in this range. The higher the digestion temperature the shorter may be the digestion period; for example, a period of 2 hours at 205° C. will yield a silica material comparable in analysis to though more useful than that obtained by digestion for 24 hours at 105° C. On the other hand, extended digestion periods of more than about 6 hours at temperatures above 190° C. result detrimentally in decreases of the reactivity and porosity of the silica material and in increases of its acidity; and at relatively low digestion temperatures of 105° to 150° C. the required digestion time of 12 to 24 hours is both too long for economical production and less conducive to the desired reactivity, porosity and very low acidity of the material.

The desired control and uniformity of product properties may be favored by the use of a digestion temperature somewhat lower than the peak temperature produced by the violent exothermic reaction. The lower digestion temperature may be reached by allowing the pressure and temperature in the reaction vessel to subside from the peak value to the desired level, whereupon that level is maintained by suitable heating of the suspension, such as by the regulated introduction of live steam.

The silica materials obtained as above described can be varied in certain properties by the selection and use of particular grades of finely divided hydrous aluminum silicate for their preparation. For example, when the silicate is kaolin so refined that its weight is made up predominantly of particles smaller than 2 microns in diameter, the total BET surface area of the silica materials may range from as little as about 50 m.²/g. up to as much as about 130 m.²/g. depending upon the particle size distribution of the kaolin used. A kaolin having 90 to 95% of its weight in particles smaller than 2 microns and 55 to 65% of its weight in particles in the range of 0 to 0.5 micron will yield materials having BET surface areas of about 80 to 130 m.²/g., while one having only 50 to 60% of its weight in particles smaller than 2 microns, with only 20 to 30% in the 0 to 0.5 micron range, will yield materials having BET surface areas of about 50 to 80 m.²/g. When it is desired to obtain the silica material with a somewhat lower surface area in the range of about 40 to 60 m.²/g. and, nevertheless, with a very high chemical reactivity, the silicate used may be a kaolin whose weight is made up predominantly of particles of 2 to 10 microns in diameter, such as the kaolin obtained from industrial clay-water slip, which typically has about 30 to 35% of its particles smaller than 2 microns and about 80% of them smaller than 10 microns. In any case the silicate used should be composed predominantly of particles smaller than 10 microns in diameter.

The conduct of the acid reaction largely governs the contents of the $SiO_2$ and metal oxides in the final silica material and the properties and range of usefulness of the material. When the initial acid concentration is so low or other conditions are such that the violent exothermic reaction does not occur, a material having the described properties fails to result. The amount of acid used is also an important factor. For example, a product obtained with a $SiO_2$ content of 81.10% by a 4-hour digestion at 177° C., after violent reaction with sulfuric acid in less than the stoichiometric amount, showed a 90-minute reactivity of less than 35% and a 60-minute reactivity of less than 15% upon being treated in a 1-N NaOH solution as hereinbefore described; while products according to the invention which were produced in the same way excepting with the use of excess quantities of sulfuric acid, so as to obtain materials having $SiO_2$ contents of 87.85% and 91.10%, respectively, showed 90-minute reactivities of 99% and 97% and 60-minute reactivities of over 90% by the same treatment.

The two materials last mentioned gave to table salt, when blended thereinto at a weight concentration of 1%, water tolerances of 0.72 and 0.77, respectively. The first mentioned product gave to table salt a water tolerance of 0.66. The most effective known table salt conditioners, e.g., the very finely divided precipitated sodium aluminum silicates hereinbefore mentioned, impart water tolerances of about 0.7 to 0.8. Unconditioned table salt generally has a water tolerance of 0.06 to 0.18.[1] The new silica materials are especially useful for conditioning table salts which are produced so as to be free of calcium and magnesium compounds; for they blend with and adhere to such salts better than do salt conditioners which contain free or combined alkali.

Figure 2:
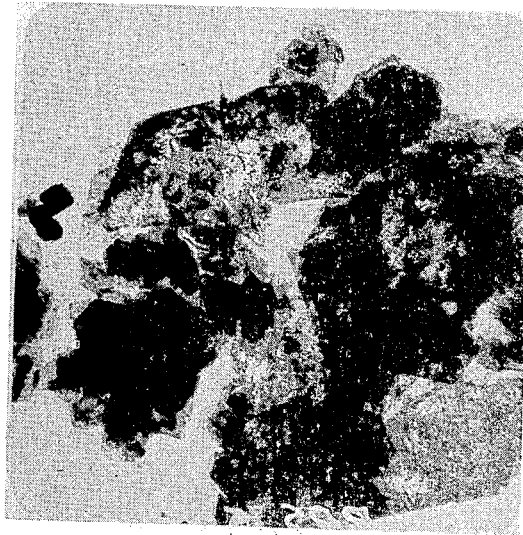

Some of the particles characteristics of silica materials provided according to the invention are evident from the electron micrographs reproduced on the accompanying drawing, in which:

FIG. 1 is a reproduction, somewhat reduced in size, of a micrograph showing a typical group of particles at 14,000 times their actual size; and FIG. 2 is a similar reproduction of a micrograph showing particles of the same material at 92,000 times their actual size.

As may be seen especially in FIG. 2, individual particles of the material are so thin and tenuous that they are almost transparent to the electrons. Some of them appear to be partially eroded away, or partially eroded away and partially reconstituted, by silica structures.

The materials and the process of the invention are further illustrated by the examples and the test data which follow.

Example A 400 pounds of a kaolin clay refined so as to have 55 to 60% of its particles smaller than 2 microns and only 20 to 25% of its particles coarser than 5 microns (an air-floated soft clay mined and refined at Langley. S.C.) was dispersed thoroughly in 453 pounds of water containing 1.0 pound of tetrasodium pyrophosphate as a dispersing aid. The kaolin had a BET surface area of 14.9 m.²/g. and the following typical analysis:

| | Percent |
|---|---|
| $Al_2O_3$ | 39.25 |
| $SiO_2$ | 45.12 |
| $Fe_2O_3$ | 0.71 |
| $TiO_2$ | 0.89 |
| CaO | 0.49 |
| MgO | 0.14 |
| $H_2O$ (combined) | 14.13 |

The kaolin dispersion was charged into a preheated lead-lined pressure reaction vessel. 504 pounds of commercial 66° Baumé sulfuric acid containing 93.19% by weight $H_2SO_4$ was then added, this quantity of acid being 100% of the amount stoichiometric to the total metal oxide content of the clay and being such as to produce in the water an acid concentration of 49.1%. During the addition of the acid and throughout the reaction the whole body of the dispersion was kept in vigorous agitation.

Upon completion of the addition of the acid, live steam was introduced into the reaction vessel until, several minutes after starting the steam flow, a violent exothermic reaction occurred which brought the material within 11 minutes from zero gauge pressure to a gauge pressure of 151 p.s.i. (temperature of 185.5° C.). In 18 minutes longer the vessel had dropped to a gauge pressure of 120 p.s.i., corresponding to a temperature of 177° C. (350° F.). This pressure and temperature were maintained for a period of 4 hours by the regulated introduction of superheated steam. The reaction vessel was then vented to a pressure of 15–20 p.s.i., and the material was then dropped into a body of diluting water which cooled it to 93° C. It was then filtered to yield a filter cake which was washed to remove free sulfuric acid and aluminum sulfate and thereafter was dried and disintegrated in a pulverizer.

The silica material resulting was analyzed and tested in various ways, giving the data set forth hereinafter in column A of Table I.

---

[1] The numerical values of water tolerance given herein represent the number of milliliters of distilled water that is tolerated by a 100-gram sample of table salt containing 1% by weight of the conditioning material, up to the point at which the salt begins to coalesce or stick in a jar containing the sample, when the water is added from a burette in increments of 2 to 3 drops and the sample is tumbled in the jar for 1 to 2 minutes after each addition.

Example B

The procedure of Example A was followed with the use of 512 pounds of water and 568.2 pounds of the sulfuric acid, giving an acid concentration of 49.1%. This quantity of acid was 112.8% of the stoichiometric amount. The gauge pressure increased from 0 to 120 p.s.i. in 4 minutes and then to a maximum of 154 p.s.i., after which it was reduced to a controlled value of 120 p.s.i. which was held for 4 hours.

The silica material obtained in this way gave the data set forth in column B of Table I.

Example C

The procedure of Example A was followed with the use of 543 pounds of water and 605 pounds of the sulfuric acid, giving an acid concentration of 49.1%. This quantity of acid was 120% of the stoichiometric amount. The gauge pressure increased from zero to a maximum of 169 p.s.i. in 14 minutes and then dropped to the controlled value in 14 minutes.

The silica material obtained in this way gave the data set forth in column C of Table I. The electron micrographs of the accompanying drawing show particles of this material.

Example D

The procedure of Example A was followed with the use of 588 pounds of water and 655 pounds of the sulfuric acid, giving an acid concentration of 49.1%. This quantity of acid was 130% of the stoichiometric amount. The gauge pressure increased from zero to a maximum of 163 p.s.i. in 12 minutes and then dropped to 120 p.s.i. in 15 minutes.

The silica material obtained in this way gave the data set forth in column D of Table I.

Example E

The procedure of Example A was followed with the use of 680 pounds of water and 756 pounds of the sulfuric acid, giving an acid concentration of 49.1%. The gauge pressure increased from zero to a maximum of 166 p.s.i. in 11 minutes and then dropped to 120 p.s.i. in 16 minutes.

The silica material obtained in this way gave the data set forth in column E of Table I.

TABLE I

| Chemical Analyses | Silica Materials of Examples | | | | |
|---|---|---|---|---|---|
| | A | B | C | D | E |
| Percent SiO₂ | 83.20 | 87.85 | 90.90 | 91.10 | 91.50 |
| Percent H₂O (ignition loss at 900° C. from weight when dry at 105° C.) | 7.79 | 6.44 | 5.30 | 5.47 | 5.30 |
| Percent Metal Oxides | 9.01 | 5.71 | 3.80 | 3.43 | 3.20 |
| Reactivity: Percent of SiO₂ Content Soluble in 1-N NaOH at 50° C.— | | | | | |
| In 60 min | 26.7 | 93.8 | 94.2 | 97.0 | 97.0 |
| In 90 min | 49.1 | 99.0 | 96.6 | 97.0 | 97.0 |
| In 120 min | 88.2 | 99.4 | 97.0 | 97.0 | 97.0 |
| BET Surface Area: | | | | | |
| Total, m.²/g | 59.1 | 69.7 | 67.5 | 64.1 | 60.2 |
| Flat area, m.²/g | 50.8 | 59.2 | 58.7 | 46.8 | 40.9 |
| Pore area, m.²/g | 8.3 | 10.5 | 8.8 | 17.3 | 19.3 |
| Percent of Surface Area in Pores | 14 | 15 | 13 | 27 | 32 |
| Water Tolerance Given to Salt | .70 | .72 | .71 | .77 | .76 |
| Acidity, mol eq./100 g | .002 | .003 | .004 | .004 | .004 |
| Oil Absorption, cc./100 g | 102 | 129 | 108 | 103 | 103 |
| Percent Water Absorption at 72 Relative Humidity | 4.33 | 4.21 | 4.67 | 4.90 | 4.53 |
| Silanol Concentration micromol/m.² of flat surface area | 22.1 | 23.4 | 24.2 | 25.4 | 27.0 |

The silanol concentrations of the materials were determined by use of the Zerewitinoff Reagent method for determining active hydrogen, according to techniques described in Siggia, "Quantitative Organic Analysis Via Functional Groups" (Wiley & Sons, 1949), page 41, and Guenther, "Determination of Silanol with Grignard Reagent," Analytical Chemistry, vol. 3, No. 6 (June 1958), page 1118.

The term "kaolin" or "kaolin clay" as used herein includes those clays which in the raw state contain as their chief constituent one or more of the naturally occurring hydrous aluminum silicates, such as kaolinite or halloysite, the composition of which may be represented by the formula $$Al_2O_3 \cdot 2SiO_2 \cdot nH_2O$$

$n$ generally being 2. The naturally occurring hydrous aluminum silicates or clays useful in the production of materials according to the invention generally contain $SiO_2$ and $Al_2O_3$ in a weight ratio of between about 1.0 and about 1.5.

The process herein described may be used with appropriate modifications for the production of valuable silica materials from clay minerals of types other than those specified above, including sericites, crystalline 3-layer types such as montmorillonites, vermiculites and illites, crystalline mixed layer types such as chlorites, and crystalline chain-structure types such as attapulgites.

The attapulgites may be reacted by the use of acid concentrations of less than 20% by weight, to yield silica materials which have higher surface areas and are more sorptive than the materials produced from kaolin as hereinabove described, but which are more abrasive and less reactive than the latter.

Sericites may be reacted to yield silica materials having extremely low BET surface areas of 5 to 15 m.²/g.

Montmorillonites and the like can be reacted with excess sulfuric acid at temperatures as hereinabove described, but with a considerable reduction of the amount of acid required per pound of mineral, to yield materials containing at least 90% of $SiO_2$ with less than 2% of metal oxides and having surface areas of 80 to 100 m.²/g. but which are only moderately reactive in comparison with the silica materials produced from kaolins as herein described.

Further species of reactive particulate silica materials having distinctive characteristics of the materials herein set forth but also differing from these materials in important respects are set forth in our copending application Ser. No. 149,964, filed Nov. 3, 1961.

We claim:
1. A reactive silica material composed of discrete, phylloidal particles consisting essentially of silica and bound water arranged in laminar networks containing silanol (SiOH) groups at a concentration of more than 10 micromols per square meter of their flat BET surface area, said particles having a BET surface area in the range of from 40 to 130 m.²/g., their facial dimensions being predominantly in the range of from about 0.1 to about 5 microns and their thicknesses being predominantly in the range of from about .005 to about .05 micron.

2. A material as claimed in claim 1, said particles containing, by analyses based upon their weight when dry at 105° C., at least 82% of $SiO_2$, at least 5% of $H_2O$, and less than 12% of other oxides.

3. A material as claimed in claim 1, at least 85% of the $SiO_2$ content of said particles being soluble within 120 minutes in a 1-N aqueous solution of NaOH when reacted therein at 50° C. at a concentration equivalent to 39.6 grams of $SiO_2$ per liter of such solution.

4. A reactive silica material as claimed in claim 1, said particles containing, by analyses based upon their weight when dry at 105° C., more than 85% of $SiO_2$, from 5 to 10% of $H_2O$, and less than 10% of other oxides.

5. A reactive silica material composed of discrete, phylloidal, particles containing, by analyses based upon their weight when dry at 105° C., at least 82% of $SiO_2$, from 5 to 10% of $H_2O$, and less than 10% of other oxides, the facial dimensions of said particles being in the range of from about 0.1 to about 5 microns, their thicknesses being in the range of from about .005 to about .050 micron and their BET surface area being in the range of from 40 to 130 m.²/g.

6. A material as claimed in claim 5, from 10 to 40% of the surface area of said particles being constituted by pores present in the particle surfaces and predominantly of from .002 to .0045 micron in diameter.

7. A reactive silica material composed of discrete, phylloidal particles containing, by analyses based upon their weight when dry at 105° C., more than 85% of $SiO_2$, from 5 to 10% of $H_2O$ and less than 10% of other oxides, said particles having thicknesses predominantly in the range of from about .005 to about .05 micron and their facial dimensions being predominantly in the range of from about 0.1 to 5 microns, at least 90% of the $SiO_2$ content of said particles being soluble within 60 minutes in a 1-N aqueous solution of NaOH when reacted therein at 50° C. at a concentration equivalent to 39.6 grams of $SiO_2$ per liter of such solution.

8. A process of producing a reactive particulate silica material, which comprises forming a suspension of a finely particulate kaolin in a 30 to 60% aqueous solution of sulfuric acid containing an amount of said acid sufficient to extract more than 85% of the metal oxide content of the kaolin particles; heating the suspension in a closed pressure vessel until there occurs therein a violent exothermic reaction that brings the suspension within a few minutes to a temperature between 150° C. and 230° C. and to the corresponding multi-atmospheric steam pressure; after said violent reaction digesting the suspension at a temperature between 105° C. and 230° C. and under the corresponding superatmospheric steam pressure until said solution has extracted from the suspended particles more than 85% of their metal oxide content; and thereafter separating the suspended solids from the reaction liquid.

9. A process according to claim 8, said solution containing an amount of sulfuric acid at least approximately stoichiometric to the metal oxide content of the kaolin in said suspension.

10. A process as claimed in claim 8, said kaolin being composed predominantly by weight of particles smaller than 10 microns in diameter.

11. A process as claimed in claim 8, said kaolin being composed predominantly by weight of particles smaller than 2 microns in diameter.

12. A process as claimed in claim 8, the digestion being effected for a period of hours at a regulated temperature above 150° C. but lower than the peak temperature imparted to the suspension by the violent exothermic reaction.

13. A process as claimed in claim 8, the suspension being brought to a temperature of 180° to 205° C. by the violent exothermic reaction and the digestion being effected for a period of hours at a temperature of 160° to 190° C.

14. A process according to claim 8, live steam being injected into the suspension to effect said heating whereby to initiate the violent exothermic reaction.

15. A process according to claim 8, the suspension being formed by forming a heated dispersion of said kaolin in water and adding a concentrated sulfuric acid to said dispersion to bring the liquid to an acid concentration of about 50 to 60% and generate heat in it whereby to initiate the violent exothermic reaction.

16. The process of producing a reactive particulate silica material, which comprises violently exothermally reacting with sulfuric acid in a closed pressure vessel an aqueous suspension of a finely particulate kaolin the particles of which by weight are predominantly smaller than 10 microns in diameter, thereby bringing the suspension within a few minutes to a temperature between 180° and 205° C. and to the corresponding multi-atmospheric steam pressure, the acid being incorporated in said suspension so as to bring the liquid of the suspension to an initial acid concentration of between 30 and 60% and live steam then being introduced into the suspension until the violent exothermic reaction is initiated, and the amount of acid being substantially in excess of that which is stoichiometric to the metal oxide content of the kaolin, after the exothermic reaction subsides digesting the suspension at a temperature between 160° and 190° C. and under the corresponding superatmospheric steam pressure for a period of about 2 to 8 hours, until said liquid has extracted from the suspended particles more than 90% of their metal oxide content; and thereafter separating the reaction liquid from the resulting solid particles.

References Cited
UNITED STATES PATENTS

| | | | |
|---|---|---|---|
| 1,976,127 | 10/1934 | Huber | 252—450 |
| 2,180,576 | 11/1939 | Baylis et al. | 252—450 |
| 2,731,326 | 1/1956 | Alexander et al. | 23—182 |
| 2,879,136 | 3/1959 | Maloney | 23—182 |
| 2,940,830 | 6/1960 | Thornhill | 23—182 |

OSCAR R. VERTIZ, *Primary Examiner.*

MAURICE A. BRINDISI, *Examiner.*

H. T. CARTER, *Assistant Examiner.*